(12) United States Patent
Moy et al.

(10) Patent No.: US 11,745,886 B2
(45) Date of Patent: Sep. 5, 2023

(54) ELECTRIC AIRCRAFT FOR GENERATING A YAW FORCE

(71) Applicant: BETA AIR, LLC, South Burlington, VT (US)

(72) Inventors: Nicholas Moy, Burlington, VT (US); Riley Griffin, Montpelier, VT (US); Lochie Ferrier, Sydney (AU); Collin Freiheit, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/361,497

(22) Filed: Jun. 29, 2021

(65) Prior Publication Data

US 2022/0411089 A1  Dec. 29, 2022

(51) Int. Cl.
- B64D 31/10 (2006.01)
- B64D 27/24 (2006.01)
- B64C 29/00 (2006.01)

(52) U.S. Cl.
CPC .......... B64D 31/10 (2013.01); B64C 29/0025 (2013.01); B64C 29/0033 (2013.01); B64D 27/24 (2013.01)

(58) Field of Classification Search
CPC . B64C 27/24; B64C 27/82; B64C 2027/8209; B64C 2027/8236; B64C 29/0033; B64C 29/005; B64D 31/10
USPC .......................................................... 244/6
See application file for complete search history.

(56) References Cited

U.S. PATENT DOCUMENTS

| | | | |
|---|---|---|---|
| 9,475,579 B2 | 10/2016 | Fredericks | |
| 10,983,534 B2 | 4/2021 | English | |
| 2009/0045294 A1* | 2/2009 | Richardson | B64C 27/26 244/7 A |
| 2010/0089053 A1* | 4/2010 | Hanlon | B64C 27/64 60/545 |
| 2013/0134253 A1 | 5/2013 | Carter, Jr. | |
| 2015/0166175 A1* | 6/2015 | Prud'Homme-Lacroix | B64C 27/52 244/17.21 |
| 2017/0057628 A1* | 3/2017 | Holly | B64C 13/50 |
| 2018/0297712 A1* | 10/2018 | Oldroyd | B64C 29/02 |
| 2018/0305005 A1* | 10/2018 | Parks | B64D 27/24 |
| 2018/0305033 A1* | 10/2018 | Joubert | G05D 1/0825 |
| 2018/0346135 A1* | 12/2018 | Haldeman | B64C 27/06 |
| 2019/0055016 A1* | 2/2019 | Groninga | B64C 27/18 |
| 2019/0291883 A1* | 9/2019 | Atamanov | B64C 27/08 |
| 2019/0337612 A1 | 11/2019 | Carter, Jr. | |
| 2019/0389573 A1 | 12/2019 | Kahou | |

(Continued)

FOREIGN PATENT DOCUMENTS

| | | | | |
|---|---|---|---|---|
| CN | 103253370 A | * | 8/2013 | ............. B64C 27/82 |
| CN | 105539835 A | * | 5/2016 | |

(Continued)

OTHER PUBLICATIONS

Title: Dart T690DANIEL Escobar By: University of Maryland; Dr. Inderjit Chopra; Date: Apr. 29, 2021.

*Primary Examiner* — Christopher P Ellis
(74) *Attorney, Agent, or Firm* — CALDWELL INTELLECTUAL PROPERTY LAW

(57) ABSTRACT

An electric aircraft for generating a yaw force includes a fuselage, a plurality of laterally extending elements secured to the fuselage, a plurality of lift components attached to the plurality of laterally extending elements, and at least a longitudinal thrust component attached to the plurality of laterally extending elements, wherein the longitudinal thrust component is configured to generate a yaw force.

17 Claims, 9 Drawing Sheets

(56) References Cited

U.S. PATENT DOCUMENTS

| | | | |
|---|---|---|---|
| 2020/0017207 A1* | 1/2020 | Alber | B64C 27/78 |
| 2020/0031481 A1 | 1/2020 | Gazzino | |
| 2020/0108919 A1* | 4/2020 | Sada | B64C 27/82 |
| 2020/0180755 A1* | 6/2020 | Prud'Homme Lacroix | B64C 27/82 |
| 2020/0298970 A1* | 9/2020 | Acee | B64C 27/06 |
| 2020/0307779 A1* | 10/2020 | Ross | F02C 6/20 |
| 2020/0317332 A1 | 10/2020 | Didey | |
| 2020/0339252 A1* | 10/2020 | Choi | B64C 27/82 |
| 2020/0385107 A1* | 12/2020 | Bowles | B64C 7/00 |
| 2021/0024208 A1 | 1/2021 | Tao | |
| 2021/0047029 A1* | 2/2021 | Stanney | B64C 27/82 |
| 2021/0094694 A1 | 4/2021 | Seminel | |
| 2021/0107667 A1* | 4/2021 | Sinha | B64D 31/06 |
| 2021/0163127 A1* | 6/2021 | Bustamante | B64C 27/82 |
| 2021/0245873 A1* | 8/2021 | Tighe | B64C 5/02 |
| 2021/0339855 A1* | 11/2021 | Sinha | B64C 27/82 |

FOREIGN PATENT DOCUMENTS

| | | | | | |
|---|---|---|---|---|---|
| CN | 106828915 A | * | 6/2017 | | |
| CN | 109383792 A | * | 2/2019 | | |
| CN | 111216883 A | * | 6/2020 | | B64C 27/20 |
| CN | 112327902 A | * | 2/2021 | | G05D 1/0072 |
| CN | 113453982 A | * | 9/2021 | | |
| DE | 102019205152 A1 | * | 10/2020 | | B60L 3/0092 |
| EP | 3067272 A1 | * | 9/2016 | | B64C 27/82 |
| EP | 3312087 A1 | * | 4/2018 | | B64D 27/02 |
| EP | 3647191 A1 | * | 5/2020 | | B64C 27/46 |
| EP | 3708499 A1 | * | 9/2020 | | B64D 31/06 |
| EP | 3725676 A1 | * | 10/2020 | | B64C 29/0033 |
| EP | 3753844 A1 | * | 12/2020 | | B64C 27/24 |
| FR | 3014411 | * | 6/2015 | | B64C 27/001 |
| FR | 3106570 | * | 7/2021 | | B64D 31/14 |
| KR | 20170015445 A | * | 2/2017 | | B64C 27/82 |
| WO | WO-2011144692 A2 | * | 11/2011 | | B64D 27/24 |
| WO | WO-2016028358 A2 | * | 2/2016 | | B64C 39/024 |
| WO | WO-2016054369 A1 | * | 4/2016 | | B64C 27/467 |
| WO | WO-2016164280 A1 | * | 10/2016 | | B64C 39/024 |
| WO | WO-2017131834 A2 | * | 8/2017 | | B64C 3/56 |
| WO | 2020180173 | | 9/2020 | | |
| WO | WO-2020180173 A1 | * | 9/2020 | | B64C 27/02 |
| WO | WO-2020198814 A1 | * | 10/2020 | | B64C 27/10 |
| WO | WO-2021118925 A1 | * | 6/2021 | | B64C 27/26 |

* cited by examiner

ELECTRIC AIRCRAFT FOR GENERATING A YAW FORCE

FIELD OF THE INVENTION

The present invention generally relates to the field of electric aircrafts. In particular, the present invention is directed to an electric aircraft for generating a yaw force.

BACKGROUND

In electrically propelled vehicles, such as an electric vertical takeoff and landing (eVTOL) aircraft, it is essential to maintain the integrity of the aircraft until safe landing. In some flights, a component of the aircraft may experience a malfunction or failure which will put the aircraft in an unsafe mode which will compromise the safety of the aircraft, passengers and onboard cargo.

SUMMARY OF THE DISCLOSURE

In an aspect an electric aircraft for generating a yaw force includes a fuselage, a plurality of laterally extending elements secured to the fuselage, a plurality of lift components attached to the plurality of laterally extending elements, and at least a longitudinal thrust component attached to the plurality of laterally extending elements, wherein the longitudinal thrust component is configured to generate a yaw force.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
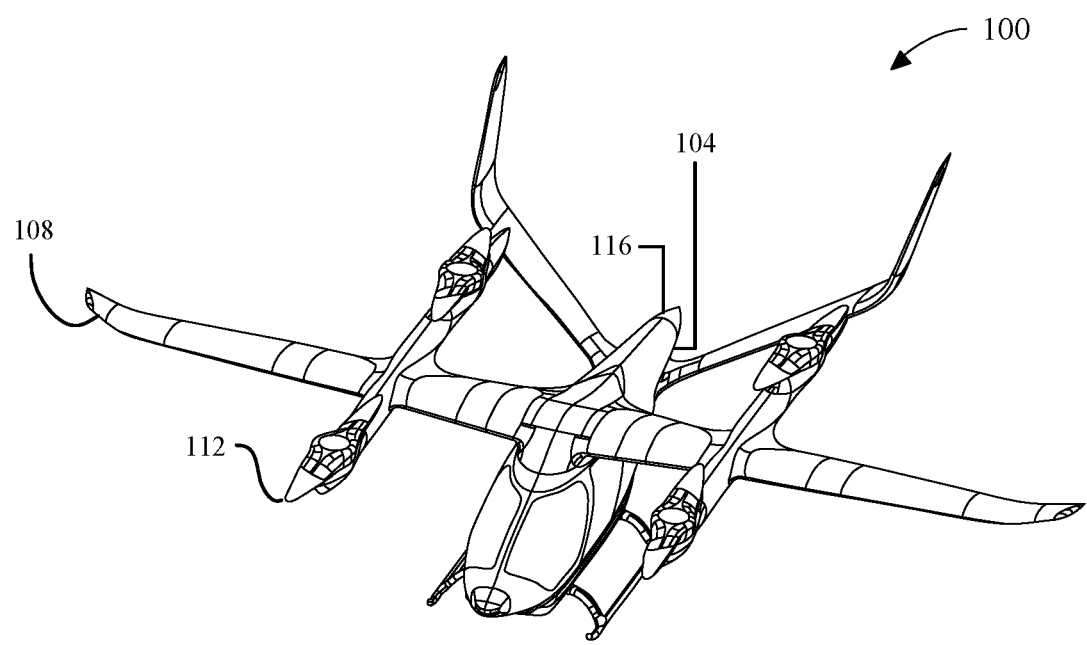
FIG. 1 is a diagrammatic representation of an exemplary embodiment of an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an aircraft for generating a yaw force. In an embodiment, this disclosure includes a fuselage, a plurality of laterally extending elements secured to the fuselage, a plurality of lift components attached to the plurality of extending elements, and at least a longitudinal thrust component configured to generate a yaw force. Aspects of the present disclosure can be used to detect a failure event of a lift component as a function of a sensor. Aspects of the present disclosure can also be used to generate a failure datum associated with the lift component. Aspects of the present disclosure can also be used to determine a yaw correction to be performed by the longitudinal thrust component. This is so, at least in part, because the disclosure incorporates a flight controller capable of determining the yaw correction. Aspects of the present disclosure allow for an aircraft for generating a yaw force. Exemplary embodiments illustrating aspects of the present disclosure are described below in the context of several specific examples.

Referring now to FIG. 1, an exemplary embodiment of an aircraft 100 for generating a yaw force is illustrated. Aircraft 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Continuing to refer to FIG. 1, an illustration of forces is illustrated in an electric aircraft. During flight, a number of forces may act upon the electric aircraft. Forces acting on an aircraft during flight may include thrust, the forward force produced by the rotating element of the aircraft and acts parallel to the longitudinal axis. Drag may be defined as a rearward retarding force which is caused by disruption of airflow by any protruding surface of the aircraft such as, without limitation, the wing, rotor, and fuselage. Drag may oppose thrust and acts rearward parallel to the relative wind. Another force acting on aircraft may include weight, which may include a combined load of the aircraft itself, crew, baggage and fuel. Weight may pull aircraft downward due to the force of gravity. An additional force acting on aircraft may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Still referring to FIG. 1, aircraft 100 includes a fuselage 104. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 104 may comprise structural elements that physically support the shape and structure of an aircraft. Structural elements may take a plurality of forms, alone or in combination with other types. Structural elements may vary depending on the construction type of aircraft and specifically, the fuselage. Fuselage 104 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 104 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 104 orthogonal to the longitudinal (nose to tail) axis of the aircraft and forms the general shape of fuselage 104. A former may comprise differing cross-sectional shapes at differing locations along fuselage 104, as the former is the structural element that informs the overall shape of a fuselage 104 curvature. In embodiments, aircraft skin can be anchored to formers and strings such that the outer mold line of the volume encapsulated by the formers and stringers comprises the same shape as aircraft 100 when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 1, fuselage 104 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 104 can include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 1, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 104. Monocoque comprises only structural skin, and in that sense, aircraft skin undergoes stress by applied aerodynamic fluids imparted by the fluid. Stress as used in continuum mechanics can be described in pound-force per square inch ($lbf/in^2$) or Pascals (Pa). In semi-monocoque construction stressed skin bears part of the aerodynamic loads and additionally imparts force on the underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 includes a plurality of laterally extending elements 108 attached to fuselage 104. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. In an embodiment, and without limitation, wing may include a leading edge. As used in this disclosure a "leading edge" is a foremost edge of an airfoil that first intersects with the external medium. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Laterally extending element 108 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 1, aircraft 100 includes a plurality of lift components 112 attached to the plurality of extending elements 108. As used in this disclosure a "lift component" is a component and/or device used to propel a craft upward by exerting downward force on a fluid medium, which may include a gaseous medium such as air or a liquid medium such as water. Lift component 112 may include any device or component that consumes electrical power on demand to propel an electric aircraft in a direction or other vehicle while on ground or in-flight. For example, and without limitation, lift component 112 may include a rotor, propeller, paddle wheel and the like thereof, wherein a rotor is a component that produces torque along a longitudinal axis, and a propeller produces torquer along a vertical axis. In an embodiment, lift component 112 may include a propulsor. In an embodiment, when a propulsor twists and pulls air behind it, it will, at the same time, push an aircraft forward with an equal amount of force. As a further non-limiting example, lift component 112 may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward. As used in this disclosure, "attached" means that at least a portion of a device, component, or circuit is connected to at least a portion of the aircraft via a mechanical coupling and/or attachment and/or fastening component and/or mechanism. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly by gaining support from the air. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

In an embodiment, and still referring to FIG. 1, lift component 112 may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 112 may include a rotating power-driven hub, to which are attached several radial airfoil-section blades such that the whole assembly rotates about a longitudinal axis. The blades are configured at an angle of attack, wherein an angle of attack is described in detail below. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point. For example, and without limitation fixed angle of attack may be 2.8° as a function of a pitch angle of 8.1° and a relative wind angle 5.3°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, and still referring to FIG. 1, lift component 112 may be configured to produce a lift. As used in this disclosure a "lift" is a perpendicular force to the oncoming flow direction of fluid surrounding the surface. For example, and without limitation relative air speed may be horizontal to aircraft 100, wherein the lift force may be a force exerted in the vertical direction, directing aircraft 100 upwards. In an embodiment, and without limitation, lift component 112 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. In an embodiment, and without limitation, lift component 112 may receive a source of power and/or energy from a power sources may apply a torque on lift component 112 to produce lift. As used in this disclosure a "power source" is a source that that drives and/or controls any component attached to aircraft 100. For example, and without limitation power source may include a motor that operates to move one or more lift components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 1, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, plurality of lift components 112 may include a first set of lift components. As used in this disclosure a "first set" is a pair of lift components that rotate in a clockwise direction. Additionally or alternatively, in an embodiment and without limitation, plurality of lift components 112 may include a second set of lift components. As used in this disclosure a "second set" is a pair of lift components rotate in a counterclockwise direction. In an embodiment, and without limitation, a lift component may revolve around a shaft, wherein the shaft is oriented along the vertical axis, wherein a vertical axis is described in detail below, in reference to FIG. 4. In an embodiment, and without limitation, a first lift component 112 may be oriented at a first reference angle with respect to a first vertical axis, wherein a second lift component is oriented at a second reference angle with respect to a second vertical axis. In an embodiment, and without limitation, plurality of lift components 112 may include a reference angle, wherein a reference angle is an angle of orientation of a lift component that differs from a vertical axis as described in detail below, in reference to FIG. 4. In an embodiment, and without limitation, first set of lift component may comprise a first nominal angle and a first canted angle, wherein the second reference angle includes a second nominal angle and a second canted angle, as described below in detail, in reference to FIG. 4. For example, and without limitation, reference angle may include a canted angle such as a 0.6° angle tilted inward and/or a 0.6° angle tilted outward. For example, and without limitation, reference angle may include a nominal angle such as a 3° angle tilted forward and/or a 3° angle tilted backward. Additionally or alternatively, the plurality of lift components 112 may have a reference angle from a vertical axis as a function of a zero-yaw configuration. As used in this disclosure a "zero-yaw configuration" is a configuration such that plurality of lift components are angled about the vertical axis to reduce and/or eliminate a yaw torque. As used in this disclosure a "yaw torque" is a torque exerted about the vertical axis of an aircraft, wherein the vertical axis has its origin at the center of gravity and is directed towards the bottom of the aircraft, perpendicular to the wings and to the fuselage reference line. As a non-limiting example a yaw torque directing the nose of an aircraft to the right of the vertical axis may be generated due to a rudder movement and/or shifting.

Still referring to FIG. 1, aircraft 100 includes at least a longitudinal thrust component 116 attached to the plurality of laterally extending elements 108. As used in this disclosure a "longitudinal thrust component" is a flight component that is mounted such that the component thrusts the flight component through a medium. As a non-limiting example, longitudinal thrust flight component 116 may include a pusher flight component such as a pusher propeller, a pusher motor, a pusher propulsor, and the like. Additionally, or alternatively, pusher flight component may include a plurality of pusher flight components. As a further non-limiting example, longitudinal thrust flight component may include a puller flight component such as a puller propeller, a puller motor, a puller propulsor, and the like. Additionally, or alternatively, puller flight component may include a plurality of puller flight components. In an embodiment, and without limitation, longitudinal thrust component 116 may include a reversible propulsor that is capable of rotating in either a clockwise and/or counterclockwise rotation. Longitudinal thrust component 116 is configured to generate a yaw force. As used in this disclosure a "yaw force" a force exerted about the yaw axis of an aircraft to change a heading angle of the aircraft. For example, and without limitation, yaw force may exert a force of 45 N to adjust one or more degrees and/or radians of the nose of aircraft 100. In another embodiment, yaw force may include a force to produce an angular velocity to change the heading angle of the aircraft. In an embodiment, and without limitation, longitudinal thrust component 116 may be attached to the leading edge of a wing as described below in detail, in reference to FIG. 4A. For example and without limitation, longitudinal thrust component 116 may be bolted and/or attached to the leading edge of the wing to generate one or more yaw forces as a function of producing a thrust. In another embodiment, and without limitation, longitudinal thrust component 116 may be secured to a vertically aligned arm that is secured to the wing, as described below in detail, in reference to FIG. 5. In an embodiment, and without limitation, vertically aligned arm may secure longitudinal thrust component 116 such that longitudinal thrust component 116 is located along a longitudinal axis similar to an aircraft central gravity, as described below in detail, in reference to FIG. 5.

In an embodiment, longitudinal thrust component 112 may include a tail rotor. As used in this disclosure a "tail rotor" is a smaller rotor mounted vertically and/or near-vertically at the tail of the aircraft. Tail rotor may rotate to generate a yaw force in the same direction as the main rotor's rotation. Tail rotor may be positioned at a distance from the aircrafts center of mass to allow for enough thrust and/or torque to rotate the aircraft in the yaw direction. Tail rotor may include an adjustable pitch. As used in this disclosure an "adjustable pitch" is a pitch of the tail rotor blades that may be varied to provide directional control of the tail rotor in the yaw axis. For example, and without limitation, the tail rotor may rotate an aircraft 3° in the positive direction of the yaw axis to maintain a flight path. In an embodiment, and without limitation, the tail rotor may be composed of a core made of aluminum honeycomb and/or plasticized paper honeycomb, covered in a skin made of aluminum, carbon fiber composite, and/or titanium. Tail rotor may be fixed and/or adjustable as a function of an actuator motor.

Still referring to FIG. 1, longitudinal thrust component 116 may include a NOTAR. As used in this disclosure a "NOTAR" is a rotor that has no rotating parts in the open. The NOTAR may include an air intake located just behind the main cabin of the aircraft. The air intake may then be thrust towards the tail boom of the aircraft as a function of a NOTAR fan that blows compressed air through the tail boom. The NOTAR fan may be variably controlled to adjust the amount of air that is forced to the end of the tail boom in the aircraft. The compressed air that NOTAR may generate may an exhaust force out of a side of the tail boom. As used in this disclosure an "exhaust force" is a force that is expelled to provide directional control of the aircraft in the yaw axis. For example, and without limitation a NOTAR may expel an exhaust force out of the left side of the tail boom, wherein the tail boom moves in the yaw axis to the right, adjusting the nose of the aircraft to the left.

Figure 2:
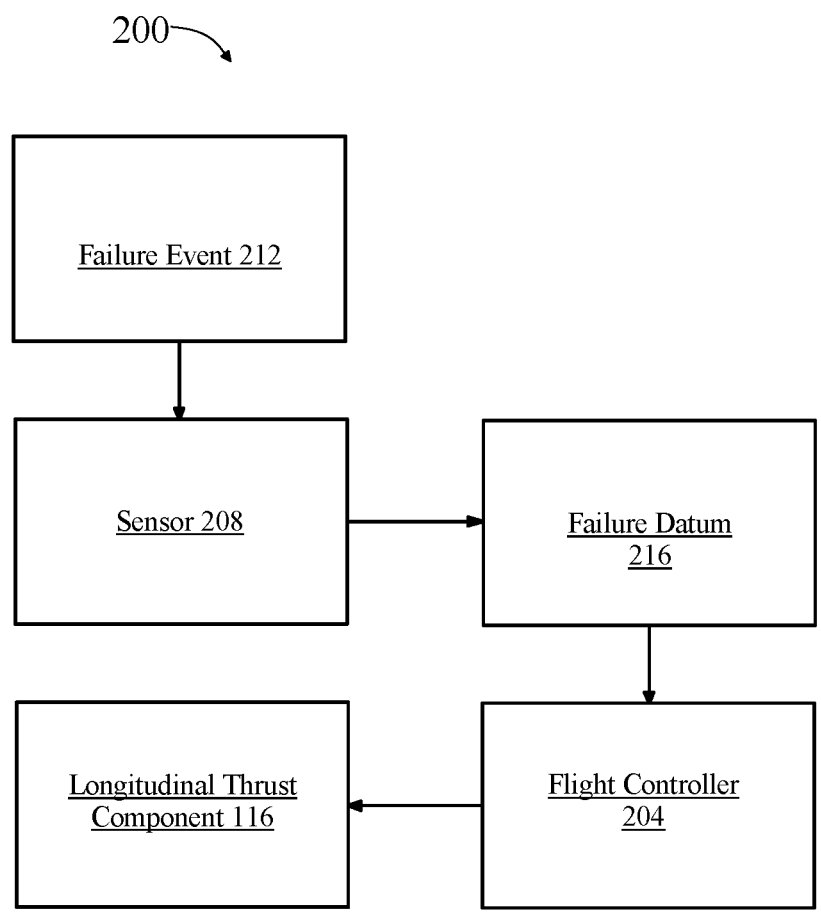
FIG. 2 is a block diagram illustrating an exemplary embodiment of an electric aircraft for generating a yaw force.

Now referring to FIG. 2, an exemplary embodiment 200 of a method for generating a yaw force is illustrated. In an embodiment, and without limitation, longitudinal thrust component 108 may be configured to generate yaw force as a function of a flight controller 204. As used in this disclosure a "flight controller" is a computing device of a plurality of computing devices dedicated to data storage, security, distribution of traffic for load balancing, and flight instruction. Flight controller may include and/or communicate with any computing device as described in this disclosure, including without limitation a microcontroller, microprocessor, digital signal processor (DSP) and/or system on a chip (SoC) as described in this disclosure. Further, flight controller may include a single computing device operating independently, or may include two or more computing device operating in concert, in parallel, sequentially or the like; two or more computing devices may be included together in a single computing device or in two or more computing devices. In embodiments, flight controller may be installed in an aircraft, may control the aircraft remotely, and/or may include an element installed in the aircraft and a remote element in communication therewith.

In an embodiment, and still referring to FIG. 2, flight controller 204 may include a reconfigurable hardware platform. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform may be reconfigured to enact any algorithm and/or algorithm selection process received from another computing device and/or created using machine-learning and/or neural net processes as described below.

Still referring to FIG. 2, flight controller 204 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 2, flight controller 204 may include, but is not limited to, for example, a cluster of computing devices in a first location and a second computing device or cluster of computing devices in a second location. Flight controller may include one or more computing devices dedicated to data storage, security, distribution of traffic for load balancing, and the like. Flight controller 204 may be configured to distribute one or more computing tasks as described below across a plurality of computing devices of computing device, which may operate in parallel, in series, redundantly, or in any other manner used for distribution of tasks or memory between computing devices. Flight controller 204 may also be implemented using a "shared nothing" architecture in which data is cached at the worker, in an embodiment, this may enable scalability of aircraft 100 and/or computing device.

In an embodiment, and with continued reference to FIG. 2, flight controller 204 may be designed and/or configured to perform any method, method step, or sequence of method steps in any embodiment described in this disclosure, in any order and with any degree of repetition. For instance, flight controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 2, flight controller may be communicatively connected to the plurality of lift components 112. As used herein, "communicatively connecting" is a process whereby one device, component, or circuit is able to receive data from and/or transmit data to another device, component, or circuit. A communicative connection may be achieved through wired or wireless electronic communication, either directly or by way of one or more intervening devices or components. Further, communicative connecting can include electrically coupling at least an output of one device, component, or circuit to at least an input of another device, component, or circuit. For example, via a bus or other facility for intercommunication between elements of a computing device as described in this disclosure. Communicative connecting may also include indirect connections via wireless connection, radio communication, low power wide area network, optical communication, magnetic, capacitive, or optical coupling, or the like. In an embodiment, and without limitation, flight controller 204 may be configured to command the plurality of light components to perform a rotational operation. As used in this disclosure a "rotational operation" is an operation performed by a lift component such that the lift component rotates. As a non-limiting example, rotational operation may denote that a lift component should establish and/or maintain a specific speed, velocity, and/or acceleration. As a further non-limiting example, rotational operation may denote that a lift component should rotate in a particular direction such as clockwise and/or counterclockwise.

Still referring to FIG. 2, flight controller 204 may be communicatively connected to a sensor 208. A "sensor", as used herein, is a device, module, and/or subsystem, utilizing any hardware, software, and/or any combination thereof to detect events and/or changes in the instant environment and transmit the information. Sensor 208 may be attached via a mechanically and/or communicatively coupled, as described above, to aircraft 100. Sensor 208 may be configured to detect a failure event of lift component 112. Sensor 208 may be communicatively connected to an energy source and/or motor, wherein sensor detects one or more conditions of the energy source and/or motor. One or more conditions may include, without limitation, voltage levels, electromotive force, current levels, temperature, current speed of rotation, and the like. Sensor may further include detecting electrical parameters. Electrical parameters may include, without limitation, voltage, current, ohmic resistance of a flight component. Sensor 208 may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 208 may include at least a geospatial sensor. Sensor 208 may be located inside an aircraft; and/or be included in and/or attached to at least a portion of the aircraft. Sensor 208 may include one or more proximity sensors, displacement sensors, vibration sensors, and the like thereof. Sensor 208 may be used to monitor the status of aircraft 100 for both critical and non-critical functions. Sensor 208 may be incorporated into vehicle or aircraft or be remote.

Still referring to FIG. 2, sensor 208 may detect a failure event 212 of lift component 112 of the plurality of lift components. As used in this disclosure a "failure event" is a failure of lift component 112 of the plurality of lift components. In an embodiment and without limitation, failure event 212 may include rotation degradation. As used in this disclosure "rotation degradation" is a reduced function of lift component 112 such that a loss of control in the yaw axis occurs. As a non-limiting example, rotation degradation may occur due to a rotor in a quadrotor configuration that is not operating at the capacity necessary to maintain the flight plan, wherein the yaw portion of the torque exerted by the remaining rotors is not eliminated and an uncontrollable yaw axis torque is exerted. In a further embodiment and without limitation, failure event may include a propulsor that is not generating enough torque to maintain the flight plan. Sensor 208 may be further configured to generate a failure datum 216 associated to the plurality of lift components 112 as a function of failure event 212. As used in this disclosure a "failure datum" is an element of data describing the failure of the lift component that has occurred. As a non-limiting example, failure datum 216 may be generated as a function of the determination that a lift component, such as a propulsor and/or rotor, is not generating torque, and/or that propulsor and/or rotor is generating less torque than expected and/or necessary to produce a level of thrust required to maintain airspeed and/or lift. As a further example, a degree of torque may be sensed, without limitation, utilizing load sensors deployed at and/or around a propulsor and/or by measuring back electromotive force (back EMF) generated by a motor driving the propulsor. Additionally or alternatively, failure datum 216 may be generated as a function of the determination that one or more power sources is losing capacity to provide sufficient power to lift component 112; this may be determined based on any suitable measure of an energy source capacity and/or output. For instance and without limitation, this may be detected by detection that one or more other lift components are consuming less power is being provided to one or more components.

Still referring to FIG. 2, failure datum 216 may be generated as a function of determining a failure event description. As used in this disclosure a "failure event description" is a description of the failure event that identifies a plurality of lift components associated with a failure event. As a non-limiting example, failure event description may include identifying a rotor, propulsor, energy source, and the like thereof as a function of a failure event associated with reduced output. Failure datum may be generated as a function of the determination that plurality of lift components 112 such as systems for directional control, wherein systems for directional control include systems that enable an aircraft to maintain a heading, direct itself in a direction as indicated by a flight plan, and/or modify direction to perform one or more flight maneuvers as described above, is unable to function correctly. For instance, where steering is directed using rudders and/or ailerons, failure datum may be generated as a function of the one or more rudders and/or ailerons are failing to move as required to effect teering commands; detection may include, without limitation, detection that servomotors or other motors controlling motion of such components, are not functioning, using back EMF, unexpectedly high and/or low amounts of impedance, measures of torque, and/or power and/or current consumption or the like, as above for motors propelling one or more propulsors. Detection may include detection of motion and/or lack thereof of a component such as an aileron and/or rudder using sensor that can detect motion. Detection of directional control failure, whether regulated by ailerons, rudders, and/or differential use of propulsors, may include a determination that expected shear stresses on the aircraft and/or one or more components thereof, as detected using load sensors, are less than they would be if the components were functioning correctly. Alternatively or additionally, detection may include detection that the aircraft is deviating from a route that would be expected if the steering components were functioning correctly.

Still referring to FIG. 2, failure datum 216 may be generated as a function of the determination that one or more power sources is losing capacity to provide sufficient power to lift component 112; this may be determined based on any suitable measure of an energy source capacity and/or output. For instance, and without limitation, an output voltage of the energy source may reduce and/or collapse below a threshold level, a current output may reduce below a threshold level, and/or a detected internal resistance may increase unexpectedly. This may alternatively or additionally be detected by detection that one or more other lift components are consuming less power and/or producing less thrust, torque, force, or the like, which may indicate that less power is being provided to one or more components. Sensor is further configured to generate a failure datum of the flight component of an aircraft as a function of the failure event. Failure datum may include, as an example and without limitation, a determination that a propulsor is damaged or otherwise operating insufficiently, such as without limitation a determination that a propulsor such as a propeller is not generating torque, and/or that the propulsor and/or propeller is generating less torque than expected and/or necessary to produce a level of thrust required to maintain airspeed and/or lift. As a further example a degree of torque may be sensed, without limitation, using load sensors deployed at and/or around a propulsor and/or by measuring back electromotive force (back EMF) generated by a motor driving the propulsor.

In an embodiment, and still referring to FIG. 2, flight controller 204 may be configured to receive failure datum 216 from the sensor 208 associated with lift component 112 and determine a yaw correction as a function of failure datum 216. As used in this disclosure a "yaw correction" is an action conducted by the plurality of longitudinal thrust components to correct and/or alter a movement of an aircraft, wherein a longitudinal thrust component is a component promotes guidance of an aircraft as described above in detail. In an embodiment, and without limitation, flight controller 204 may be configured to command longitudinal thrust component 112 as a to perform the yaw correction. In an embodiment, and without limitation, flight controller 204 may determine yaw correction as a function of receiving a longitudinally aligned angle of aircraft 100. As used in this disclosure a "longitudinally aligned angle" is a heading angle of the nose of aircraft 100 in relation to the intended flight path angle. For example, and without limitation, longitudinally aligned angle may denote that there is a 3.1° deviation from the nose of the aircraft and the intended flight path for the aircraft. In an embodiment, and without limitation, flight controller 204 may identify a yaw-torque cancellation angle as a function of the longitudinally aligned angle. As used in this disclosure a "yaw torque cancellation angle" is an angle required to reduce and/or eliminate the longitudinally aligned angle deviation from an intended flight path. For example, and without limitation, yaw torque cancellation angle may denote that a 2.8° in the left direction is required to align with the intended flight path. In an embodiment, and without limitation, flight controller 204 may receive longitudinally aligned angle as a function of obtaining a yaw input. As used in this disclosure a "yaw input" is any input and/or datum that identifies a longitudinally aligned angle. For example, and without limitation, yaw input may be obtained as a function of a yaw detector. As used in this disclosure a "yaw detector" is one or more sensors that are capable of determining a longitudinally aligned angle, yaw velocity, and/or yaw acceleration. Yaw detector may measure the ground velocity at two geometrically separated points on the body of the aircraft. In an embodiment and without limitation, the yaw detector may include a gyroscope. As used in this disclosure a "gyroscope" is a detector that may measure orientation and/or angular velocity. For example, and without limitation, gyroscopes may include microchip-packaged MEMS gyroscopes, gyrometers, solid-state ring lasers, fiber optic gyroscopes, quantum gyroscopes, inertial navigation systems, gyrocompasses, and the like thereof. Additionally or alternatively, yaw detector may include a haltere component. As used in this disclosure a "haltere component" is a vibrating gyroscope that extends from the aircraft along the yaw axis. In an embodiment, and without limitation, haltere component may rapidly oscillate along the extensions to detect any rotation of the plane of oscillation as a function of a Coriolis effect. As used in this disclosure a "Coriolis effect" is an inertial and/or fictitious force that acts on objects that are in motion within a frame of reference that rotates with respect to an inertial frame. For example, and without limitation, one or more haltere components may determine a yaw axis direction as a function of the vibrating gyroscopes and the aircrafts yaw velocity.

In an embodiment, and still referring to FIG. 2, yaw detector may include an accelerometer. As used in this disclosure an "accelerometer" is a detector that measures proper acceleration. Accelerometers may measure proper acceleration as a function of measuring motion and/or vibration by converting physical movement into an electrical signal suitable for measurement, recording, analysis, and/or control. For example, and without limitation, accelerometers may exhibit a flat amplitude sensitivity and phase response with respect to frequency, and straight-line amplitude. As a further non-limiting example, accelerometers may include one or more inertial mass deflecting component, such as a beam and/or crystal, and/or an inertial sensing element. In an embodiment, and without limitation, accelerometers may measure proper acceleration of the aircraft and synthesis the yaw velocity as a function of the measured lateral acceleration of the aircraft at constant speed around a constant radius.

In an embodiment, and still referring to FIG. 2, flight controller 204 may identify yaw torque cancellation angle as a function of receiving a yaw torque as a function of the failure datum. Yaw torque cancellation angle may be identified by determining a nullification element as a function of the yaw torque due to the failure datum. As used in this disclosure a "nullification element" is an element that eliminates a yaw torque, such that a net zero yaw torque is exerted on the aircraft. As a non-limiting example a nullification element may include rotating a propeller at a speed of 850 rpms to correct a flight component failure such that the net yaw torque is zero. As a further non-limiting example a nullification element may include forcing compressed air through a NOTAR to move the tail of the aircraft to a 12° angle off the vertical axis to correct a flight component failure such that the net yaw torque is zero. In an embodiment, and without limitation, yaw torque cancellation angle may be identified as a function of one or more external factors, wherein external factors include air speed, flight component movements, such as revolutions per minute, weather, altitude, and the like thereof.

Figure 3:
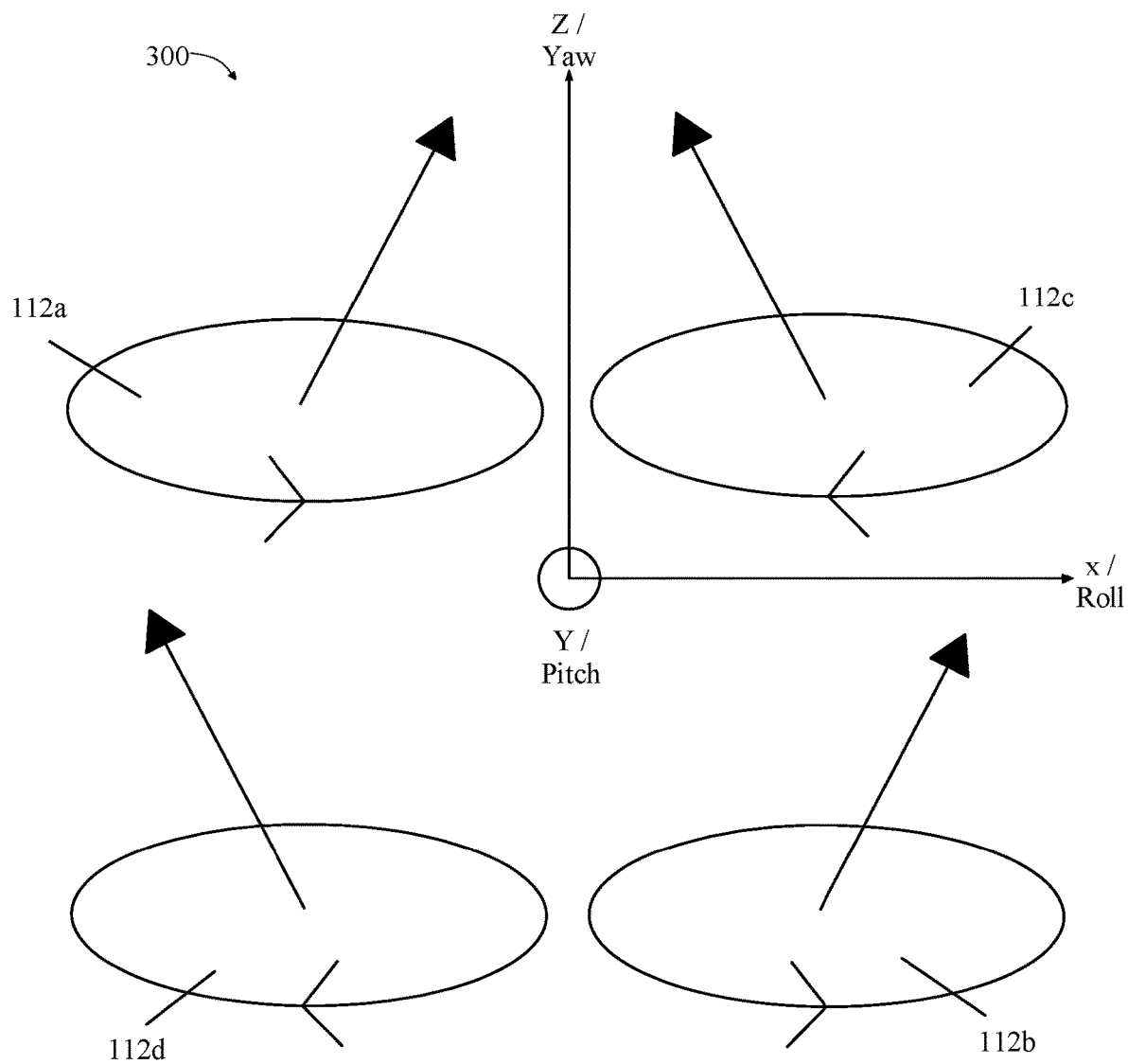
FIG. 3 is a diagrammatic representation of a zero-yaw configuration.

Now referring to FIG. 3, an embodiment of zero-yaw configuration 300 is displayed. A plurality of lift components 112a-d attached to an aircraft includes a first lift component 112a and second lift component 112b are rotating in a counter-clockwise direction. First lift component 112a and second lift component 112b may be attached at an angle to produce a yaw contribution along the roll axis in a positive direction. First lift component 112a may include any first lift component as described above in the entirety of this disclosure. Second lift component 112b may include any second lift component as described above in further detail. Further, in the embodiment, third lift component 112c and fourth lift component 112d are rotating in a clockwise direction. Third lift component 112c and fourth lift component 112d may be attached at an angle to produce yaw contribution along the roll axis in a negative direction. Third lift component 112c may include any third lift component as described above in further detail. Fourth lift component 112d may include any fourth lift component as described above in further detail in the entirety of this disclosure. In the embodiment, to control yaw of the aircraft, third lift component 112c and fourth lift component 112d to spin on the diagonal, such that pitch or roll torque is not coupled with yaw. Moreover, the sum of yaw contribution is negated as each lift component cancels the opposing yaw contributions of the subsequent lift components.

Figure 4A:
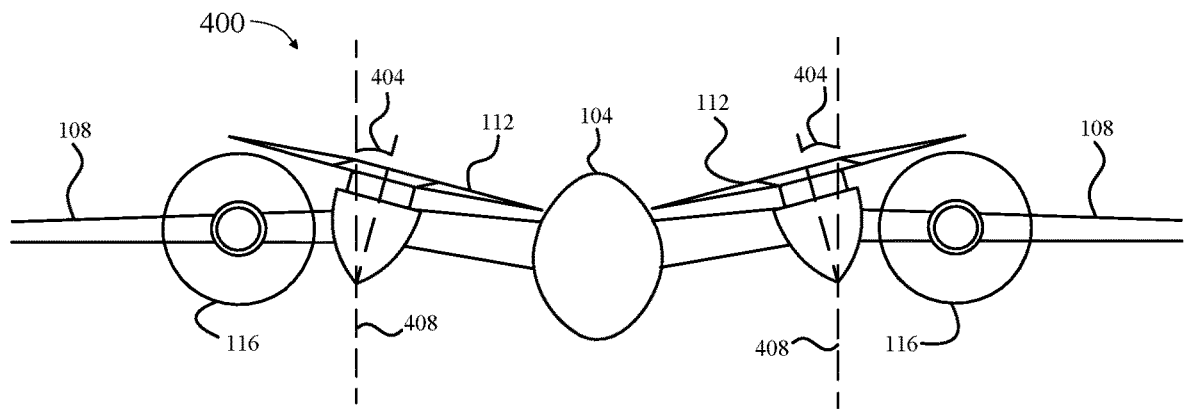
FIG. 4A-B is a diagrammatic representation of a longitudinal thrust component attached to leading edge of a wing according to an embodiment of the invention.

Now referring to FIG. 4A, an exemplary embodiment 400 of a longitudinal thrust component 116 attached to leading edge of a wing is illustrated. Longitudinal thrust component 116 includes any of the longitudinal thrust component 116 as described above, in reference to FIGS. 1-3. A wing includes any of the wing as described above, in reference to FIGS. 1-3. A leading edge includes any of the leading edge as described above in reference to FIGS. 1-3. Longitudinal thrust component 116 may be secured to the leading edge of a wing wherein longitudinal thrust component is located laterally to lift component 112. In an embodiment, and without limitation, lift component 112 may be angled at a front reference angle 404. As used in this disclosure a "front reference angle" is an angle of orientation of a lift component that differs from a vertical axis 404 for lift components located towards the nose of aircraft 100. As used in this disclosure a "vertical axis" is an axis that extends from below an aircraft to above the aircraft in a vertical direction. For example, and without limitation, vertical axis 408 may include an axis that extends from the bottom of aircraft 100 to the top of aircraft 100. For example, and without limitation, first reference angle 404 may include a canted angle such as a 0.6° angle tilted inward and/or a 0.6° angle tilted outward from vertical axis 408. For example, and without limitation, first reference angle 404 may include a nominal angle such as a 0.6° angle tilted forward and/or a 0.6° angle tilted backward from vertical axis 408. In an embodiment, and without limitation, first reference angle 404 may include a range of motion. As used in this disclosure a "range of motion" is a maximum amount of angular movement that a lift component may perform. For example, and without limitation, range of motion may include a range such as −20°-+20° along an axis. As a further non-limiting example, gimbal may include a range such as −50°-+50° along an axis. In an embodiment, and without limitation, an axis may include one or more vertical axis, longitudinal axis, yaw axis, boom axis, and the like thereof. In an embodiment, and without limitation, range of motion may be performed as a function of a gimbal. As used in this disclosure a "gimbal" is a pivoted support component that secures lift components 112 to laterally extending element 108. In an embodiment, and without limitation, gimbal may include a pivoted support to permit rotation about vertical axis 408. For example, and without limitation, gimbal may allow plurality of lift components 112 to remain independent of the rotation of the laterally extending element 108. In an embodiment, and without limitation gimbal may secure and/or maintain lift component 112 at first reference angel 404.

Figure 4B:
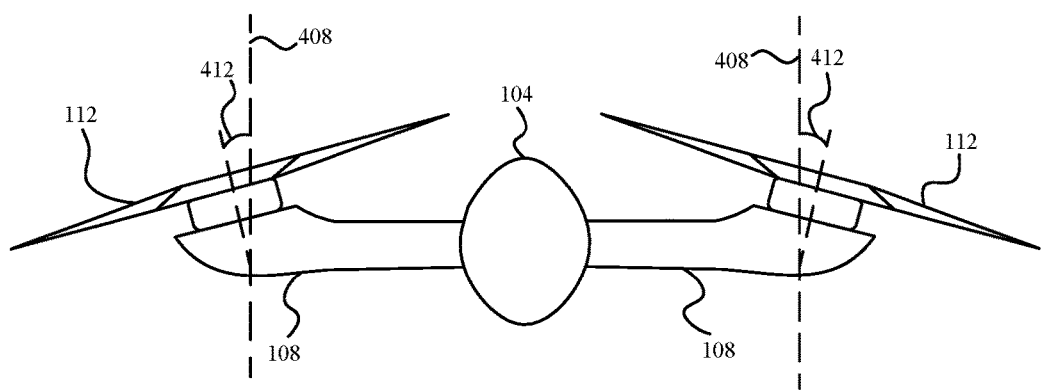

In an embodiment, and now referring to FIG. 4B, lift component 112 may be angled at a rear reference angle 412. As used in this disclosure a "rear reference angle" is an angle of orientation of a lift component that differs from a vertical axis 404 for lift components located towards the tail of aircraft 100, wherein a vertical axis is described above. For example, and without limitation, second reference angle 412 may include a canted angle such as a 3° angle tilted inward and/or a 3° angle tilted outward from vertical axis 408. For example, and without limitation, second reference angle 412 may include a nominal angle such as a 3° angle tilted forward and/or a 3° angle tilted backward from vertical axis 408. In an embodiment, and without limitation, second reference angle 412 may include a range of motion. As used in this disclosure a "range of motion" is a maximum amount of angular movement that a lift component may perform. For example, and without limitation, range of motion may include a range such as −20°-+20° along an axis. As a further non-limiting example, gimbal 504 may include a range such as −50°-+50° along an axis. In an embodiment, and without limitation, an axis may include one or more vertical axis, longitudinal axis, yaw axis, boom axis, and the like thereof. In an embodiment, and without limitation, range of motion may be performed as a function of a gimbal. For example, and without limitation, gimbal may allow plurality of lift components 112 to remain independent of the rotation of the laterally extending element 108. In an embodiment, and without limitation gimbal may secure and/or maintain lift component 112 at second reference angel 412.

Figure 5:
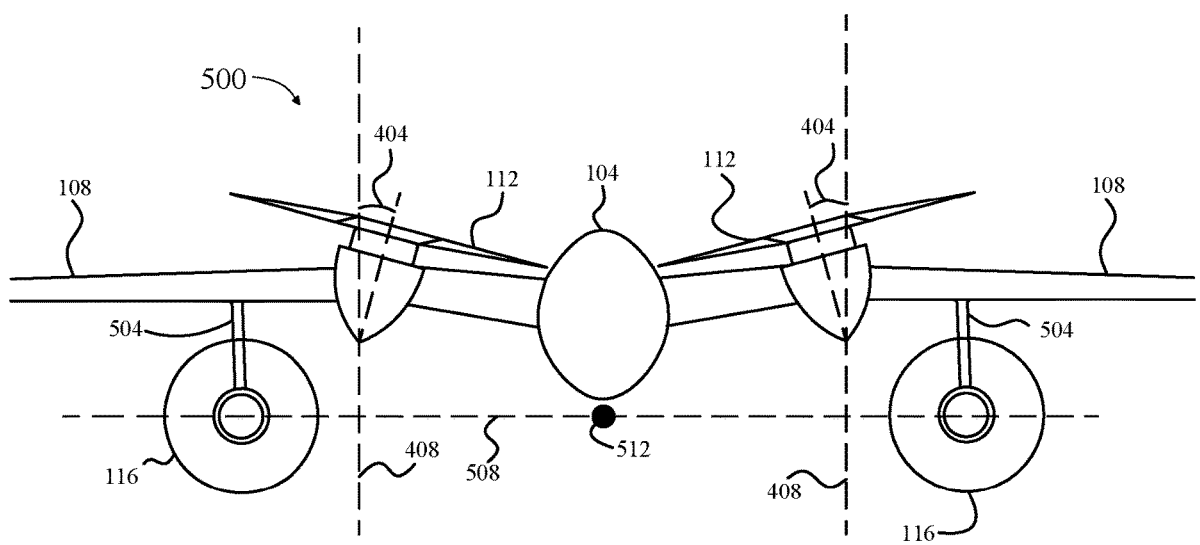
FIG. 5 is a diagrammatic representation of a longitudinal thrust component attached to a vertically aligned arm according to an embodiment of the invention.

Now referring to FIG. 5, an exemplary embodiment 500 of a longitudinal thrust component 116 attached to a vertically aligned arm 504. Longitudinal thrust component 116 includes any of the longitudinal thrust component 116 as described above, in reference to FIGS. 1-4. As used in this disclosure a "vertically aligned arm" is a bracket and/or structure that secures longitudinal thrust component to a wing at a vertically offset distance, wherein a wing is described above in detail, in reference to FIGS. 1-4. For example, and without limitation, vertically aligned arm 504 may include a bracket that secures longitudinal thrust component 116 to wing at a distance of 1 m. As a further non-limiting example, vertically aligned arm may include a brace that secures longitudinal thrust component 116 to wing at a distance of 0.25 m. In an embodiment, and without limitation, vertically aligned arm 504 may secure longitudinal thrust component 116 at a distance such that longitudinal thrust component is located along a longitudinal axis 508 of an aircraft central gravity 512. As used in this disclosure a "longitudinal axis" is an axis that extends from a first lateral element in a left direction through fuselage 104 to a second lateral element in a right direction. For example, and without limitation, longitudinal axis 508 may include an axis that extends from a left wing through fuselage 104 to a right wing. As used in this disclosure an "aircraft central gravity" is the location of the aircraft that comprises the concentrated area of the total weight of the aircraft. In an embodiment, and without limitation, aircraft central gravity 512 may be located below aircraft 100 and/or located within aircraft 100.

Figure 6:
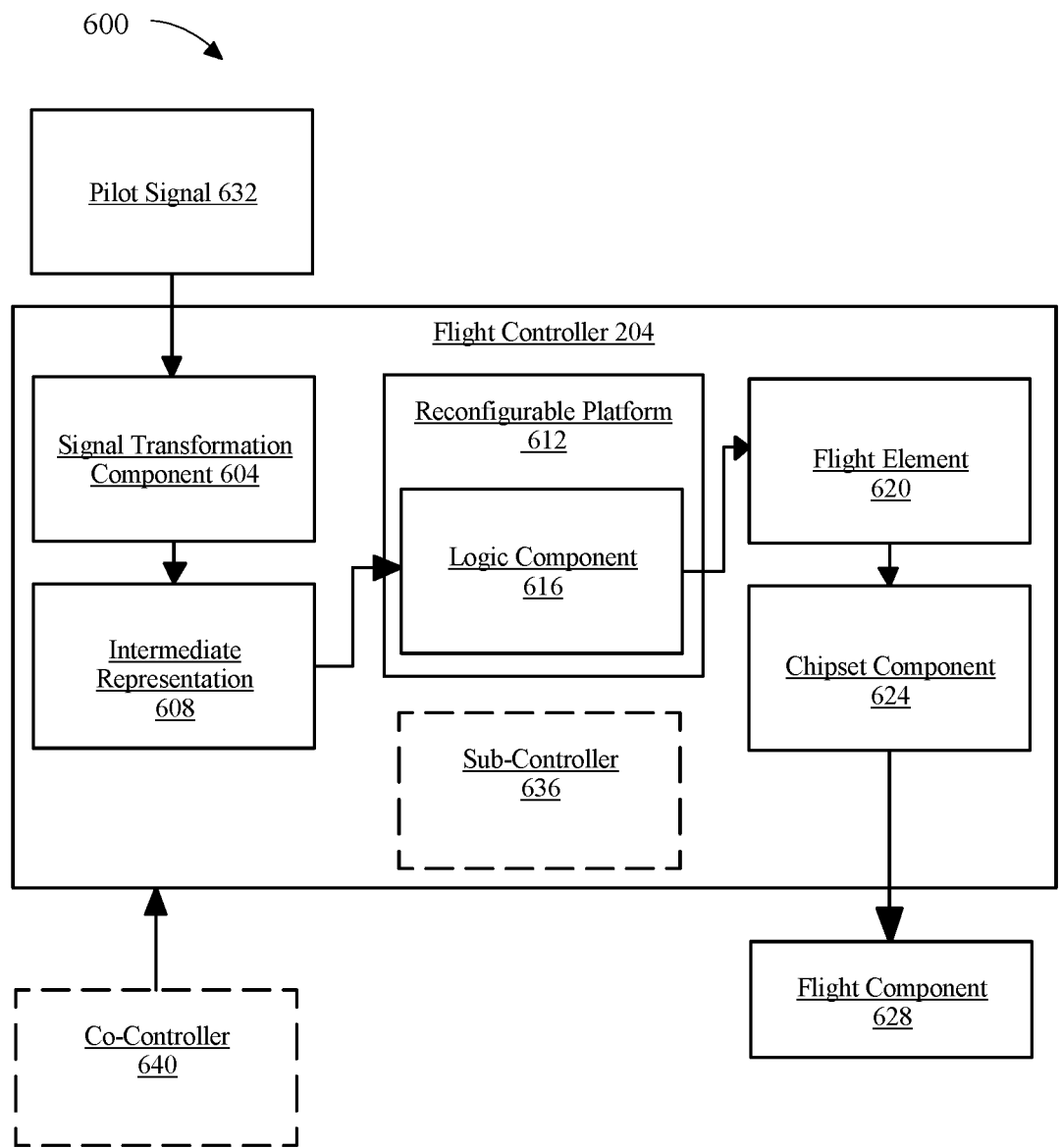
FIG. 6 is a block diagram illustrating an exemplary embodiment of a flight controller.

Now referring to FIG. 6, an exemplary embodiment 600 of a flight controller 204 is illustrated, wherein flight controller 204 is a computing device of a plurality of computing devices dedicated to data storage, security, distribution of traffic for load balancing, and flight instruction, as described above, in reference to FIGS. 1-5. Flight controller 204 may include and/or communicate with any computing device as described in this disclosure, including without limitation a microcontroller, microprocessor, digital signal processor (DSP) and/or system on a chip (SoC) as described in this disclosure. Further, flight controller 204 may include a single computing device operating independently, or may include two or more computing device operating in concert, in parallel, sequentially or the like; two or more computing devices may be included together in a single computing device or in two or more computing devices. In embodiments, flight controller 204 may be installed in an aircraft, may control the aircraft remotely, and/or may include an element installed in the aircraft and a remote element in communication therewith.

In an embodiment, and still referring to FIG. 6, flight controller 204 may include a signal transformation component 604. As used in this disclosure a "signal transformation component" is a component that transforms and/or converts a first signal to a second signal, wherein a signal may include one or more digital and/or analog signals. For example, and without limitation, signal transformation component 604 may be configured to perform one or more operations such as preprocessing, lexical analysis, parsing, semantic analysis, and the like thereof. In an embodiment, and without limitation, signal transformation component 604 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 604 may include transforming one or more low-level languages such as, but not limited to, machine languages and/or assembly languages. For example, and without limitation, signal transformation component 604 may include transforming a binary language signal to an assembly language signal. In an embodiment, and without limitation, signal transformation component 604 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 604 may be configured to optimize an intermediate representation 608. As used in this disclosure an "intermediate representation" is a data structure and/or code that represents the input signal. Signal transformation component 604 may optimize intermediate representation as a function of a data-flow analysis, dependence analysis, alias analysis, pointer analysis, escape analysis, and the like thereof. In an embodiment, and without limitation, signal transformation component 604 may optimize intermediate representation 608 as a function of one or more inline expansions, dead code eliminations, constant propagation, loop transformations, and/or automatic parallelization functions. In another embodiment, signal transformation component 604 may optimize intermediate representation as a function of a machine dependent optimization such as a peephole optimization, wherein a peephole optimization may rewrite short sequences of code into more efficient sequences of code. Signal transformation component 604 may optimize intermediate representation to generate an output language, wherein an "output language," as used herein, is the native machine language of flight controller 204. For example, and without limitation, native machine language may include one or more binary and/or numerical languages.

In an embodiment, and without limitation, signal transformation component 604 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 204 may include a reconfigurable hardware platform 612. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 612 may be reconfigured to enact any algorithm and/or algorithm selection process received from another computing device and/or created using machine-learning processes.

Still referring to FIG. 6, reconfigurable hardware platform 612 may include a logic component 616. As used in this disclosure a "logic component" is a component that executes instructions on output language. For example, and without limitation, logic component may perform basic arithmetic, logic, controlling, input/output operations, and the like thereof. Logic component 616 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 616 may be organized according to Von Neumann and/or Harvard architecture as a non-limiting example. Logic component 616 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 616 may include one or more integrated circuit microprocessors, which may contain one or more central processing units, central processors, and/or main processors, on a single metal-oxide-semiconductor chip. Logic component 616 may be configured to execute a sequence of stored instructions to be performed on the output language and/or intermediate representation 608. Logic component 616 may be configured to fetch and/or retrieve the instruction from a memory cache, wherein a "memory cache," as used in this disclosure, is a stored instruction set on flight controller 204. Logic component 616 may be configured to decode the instruction retrieved from the memory cache to opcodes and/or operands. Logic component 616 may be configured to execute the instruction on intermediate representation 608 and/or output language. For example, and without limitation, logic component 616 may be configured to execute an addition operation on intermediate representation 608 and/or output language.

In an embodiment, and without limitation, logic component 616 may be configured to calculate a flight element 620. As used in this disclosure a "flight element" is an element of datum denoting a relative status of aircraft. For example, and without limitation, flight element 620 may denote one or more torques, thrusts, airspeed velocities, forces, altitudes, groundspeed velocities, directions during flight, directions facing, forces, orientations, and the like thereof. For example, and without limitation, flight element 620 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 620 may denote that aircraft is following a flight path accurately and/or sufficiently.

Still referring to FIG. 6, flight controller 204 may include a chipset component 624. As used in this disclosure a "chipset component" is a component that manages data flow. In an embodiment, and without limitation, chipset component 624 may include a northbridge data flow path, wherein the northbridge dataflow path may manage data flow from logic component 616 to a high-speed device and/or component, such as a RAM, graphics controller, and the like thereof. In another embodiment, and without limitation, chipset component 624 may include a southbridge data flow path, wherein the southbridge dataflow path may manage data flow from logic component 616 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 624 may manage data flow between logic component 616, memory cache, and a flight component 628. As used in this disclosure a "flight component" is a portion of an aircraft that can be moved or adjusted to affect one or more flight elements. For example, flight component 628 may include a component used to affect the aircrafts' roll and pitch which may comprise one or more ailerons. As a further example, flight component 628 may include a rudder to control yaw of an aircraft. In an embodiment, chipset component 624 may be configured to communicate with a plurality of flight components as a function of flight element 620. For example, and without limitation, chipset component 624 may transmit to an aircraft rotor to reduce torque of a first lift propulsor and increase the forward thrust produced by a pusher component to perform a flight maneuver.

In an embodiment, and still referring to FIG. 6, flight controller 204 may be configured generate an autonomous function. As used in this disclosure an "autonomous function" is a mode and/or function of flight controller 204 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 620. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 204 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 204 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 204 may generate autonomous function as a function of an autonomous machine-learning model. As used in this disclosure an "autonomous machine-learning model" is a machine-learning model to produce an autonomous function output given flight element 620 and a pilot signal 632 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 632 may denote that a pilot is controlling and/or maneuvering ailerons, wherein the pilot is not in control of the rudders and/or propulsors. In an embodiment, pilot signal 632 may include an implicit signal and/or an explicit signal. For example, and without limitation, pilot signal 632 may include an explicit signal, wherein the pilot explicitly states there is a lack of control and/or desire for autonomous function. As a further non-limiting example, pilot signal 632 may include an explicit signal directing flight controller 204 to control and/or maintain a portion of aircraft, a portion of the flight plan, the entire aircraft, and/or the entire flight plan. As a further non-limiting example, pilot signal 632 may include an implicit signal, wherein flight controller 204 detects a lack of control such as by a malfunction, torque alteration, flight path deviation, and the like thereof. In an embodiment, and without limitation, pilot signal 632 may include one or more explicit signals to reduce torque, and/or one or more implicit signals that torque may be reduced due to reduction of airspeed velocity. In an embodiment, and without limitation, pilot signal 632 may include one or more local and/or global signals. For example, and without limitation, pilot signal 632 may include a local signal that is transmitted by a pilot and/or crew member. As a further non-limiting example, pilot signal 632 may include a global signal that is transmitted by air traffic control and/or one or more remote users that are in communication with the pilot of aircraft. In an embodiment, pilot signal 632 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 204 and/or a remote device may or may not use in the generation of autonomous function. As used in this disclosure "remote device" is an external device to flight controller 204. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 204 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 204 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 204. Remote device and/or FPGA may transmit a signal, bit, datum, or parameter to flight controller 204 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 204 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 6, flight controller 204 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 204 may include, but is not limited to, for example, a cluster of flight controllers in a first location and a second flight controller or cluster of flight controllers in a second location. Flight controller 204 may include one or more flight controllers dedicated to data storage, security, distribution of traffic for load balancing, and the like. Flight controller 204 may be configured to distribute one or more computing tasks as described below across a plurality of flight controllers, which may operate in parallel, in series, redundantly, or in any other manner used for distribution of tasks or memory between computing devices. For example, and without limitation, flight controller 204 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 628. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 204. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 608 and/or output language from logic component 616, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 204 may also be implemented using a "shared nothing" architecture in which data is cached at the worker, in an embodiment, this may enable scalability of aircraft and/or computing device. Flight controller 204 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 636. As used in this disclosure a "sub-controller" is a controller and/or component that is part of a distributed controller as described above; for instance, flight controller 204 may be and/or include a distributed flight controller made up of one or more sub-controllers. For example, and without limitation, sub-controller 636 may include any controllers and/or components thereof that are similar to distributed flight controller and/or flight controller as described above. Sub-controller 636 may include any component of any flight controller as described above. Sub-controller 636 may be implemented in any manner suitable for implementation of a flight controller as described above. As a further non-limiting example, sub-controller 636 may include one or more processors, logic components and/or computing devices capable of receiving, processing, and/or transmitting data across the distributed flight controller as described above. As a further non-limiting example, sub-controller 636 may include a controller that receives a signal from a first flight controller and/or first distributed flight controller component and transmits the signal to a plurality of additional sub-controllers and/or flight components.

Still referring to FIG. 6, flight controller may include a co-controller 640. As used in this disclosure a "co-controller" is a controller and/or component that joins flight controller 204 as components and/or nodes of a distributer flight controller as described above. For example, and without limitation, co-controller 640 may include one or more controllers and/or components that are similar to flight controller 204. As a further non-limiting example, co-controller 640 may include any controller and/or component that joins flight controller 204 to distributer flight controller. As a further non-limiting example, co-controller 640 may include one or more processors, logic components and/or computing devices capable of receiving, processing, and/or transmitting data to and/or from flight controller 204 to distributed flight control system. Co-controller 640 may include any component of any flight controller as described above. Co-controller 640 may be implemented in any manner suitable for implementation of a flight controller as described above.

In an embodiment, and with continued reference to FIG. 6, flight controller 204 may be designed and/or configured to perform any method, method step, or sequence of method steps in any embodiment described in this disclosure, in any order and with any degree of repetition. For instance, flight controller 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
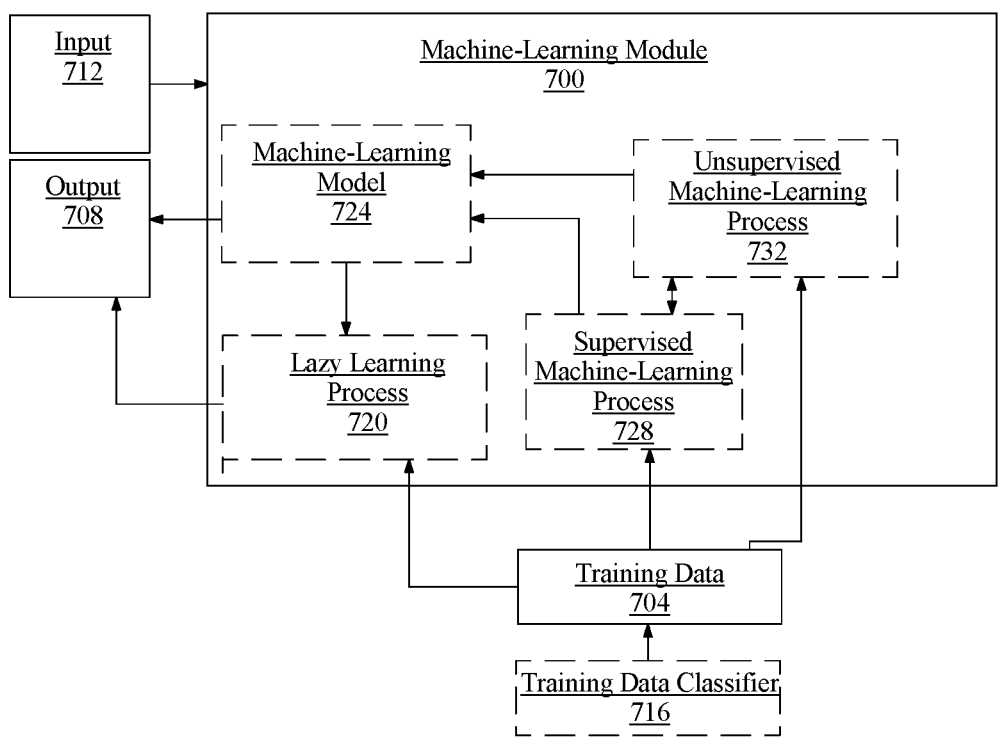
FIG. 7 is a block diagram illustrating an exemplary embodiment of a machine-learning model.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example flight elements and/or pilot signals may be inputs, wherein an output may be an autonomous function.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods.

Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
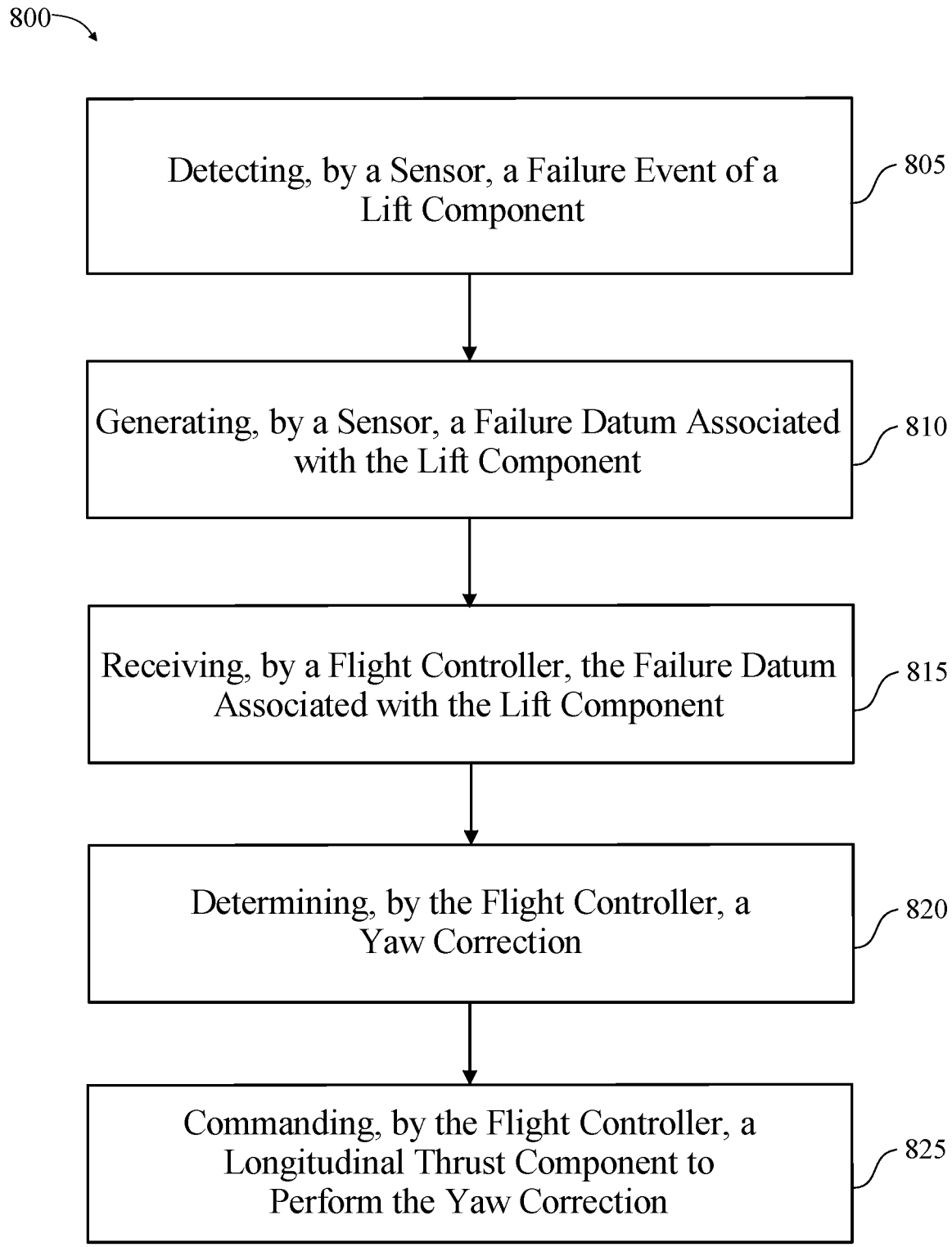
FIG. 8 is a flow diagram illustrating a method of generating a yaw force.

Now referring to FIG. 8, an exemplary embodiment for a method for generating a yaw force is illustrated. At step 805, a sensor 208 detects a failure event 212 of a lift component 112 of a plurality of lift components. Sensor 208 includes any of the sensor 208 as described above, in reference to FIGS. 1-7. Failure event 212 includes any of the failure event 212 as described above, in reference to FIGS. 1-7. Lift component 112 includes any of the lift component 112 as described above, in reference to FIGS. 1-7.

Still referring to FIG. 8, at step 810, sensor 208 generates a failure datum 216 associated with the lift component 112 of the plurality of lift components. Flight datum 216 includes any of the flight datum 216 as described above, in reference to FIGS. 1-7.

Still referring to FIG. 8, at step 815, a flight controller 204 receives failure datum 216 associated with the lift component 112 of the plurality of lift components from sensor 208. Flight controller 204 includes any of the flight controller 204 as described above, in reference to FIGS. 1-7.

Still referring to FIG. 10, at step 820, flight controller 204 determines a yaw correction as a function of the failure datum. Yaw correction includes any of the yaw correction as described above, in reference to FIGS. 1-7. In an embodiment, and without limitation, yaw correction may include one or more angular corrections.

Still referring to FIG. 8, at step 825, flight controller 204 commands a longitudinal thrust component 116 to perform the yaw correction. Longitudinal thrust component 116 includes any of the longitudinal thrust component 116 as described above, in reference to FIGS. 1-7. In an embodiment, flight controller 204 may command longitudinal thrust component 116 to perform the yaw correction as a function of an actuator. Actuator includes any of the actuator as described above, in reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
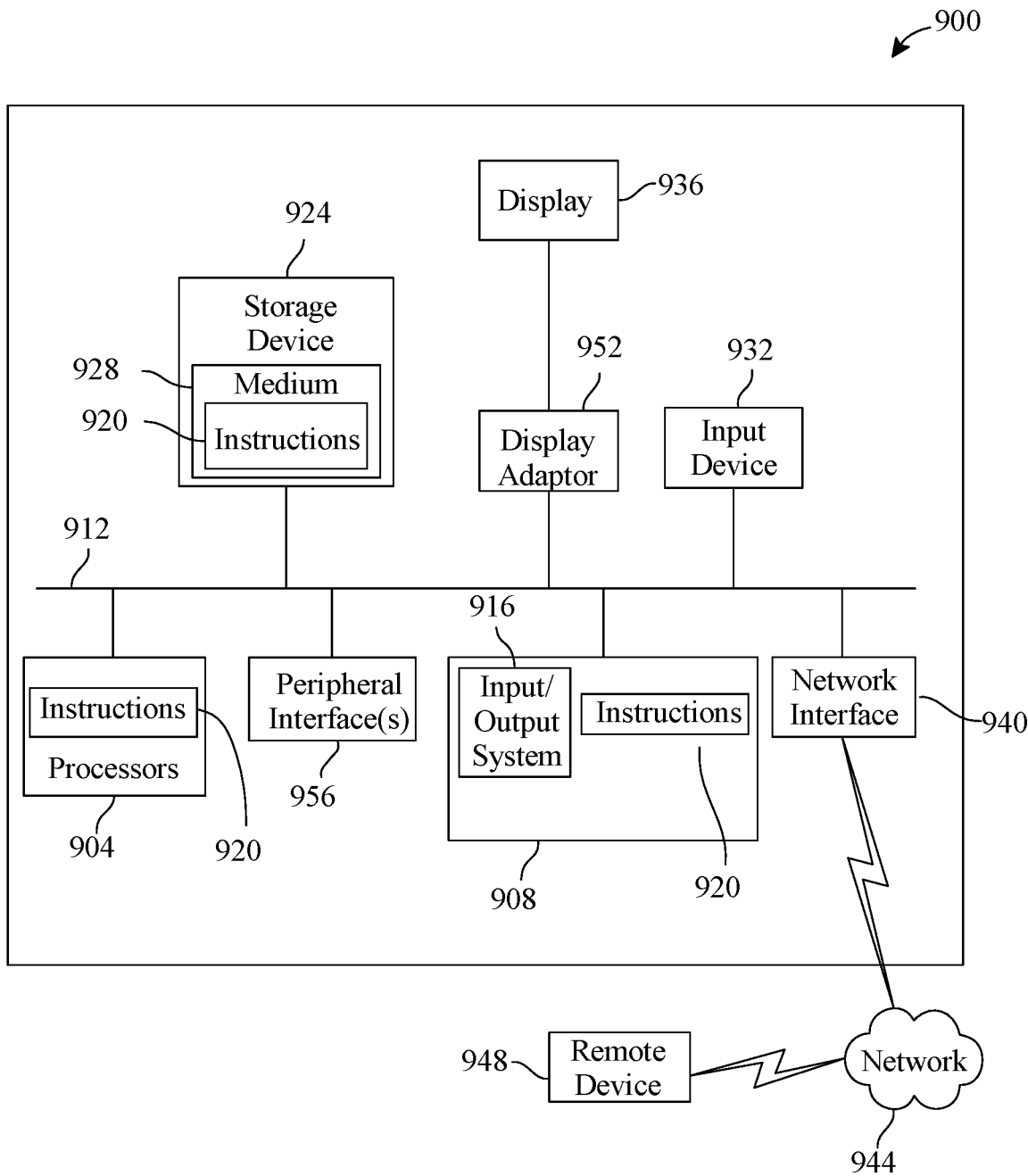
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve an aircraft and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric aircraft, wherein the electric aircraft comprises:
    a fuselage;
    a plurality of laterally extending elements secured to the fuselage;
    a plurality of lift components attached to the plurality of laterally extending elements, wherein each of the plurality of lift components has an adjustable lift angle with respect to a vertical axis, and wherein the plurality of lift components comprises:
        a first set of lift components positioned in front of the center of gravity of the aircraft; and
        a second set of lift components positioned to the rear of the center of gravity of the aircraft, wherein the second set of lift components is configured to rotate in a counterclockwise direction; and at least a longitudinal thrust component attached to the plurality of laterally extending elements by a vertically aligned arm configured to secure the longitudinal thrust component to the laterally extending elements at a vertically offset distance, wherein the longitudinal thrust component is configured to generate a yaw force, wherein the longitudinal thrust component is located along a longitudinal axis of the electric aircraft central gravity located below the electric aircraft; and a flight controller communicatively connected to a sensor, wherein the sensor is configured to detect a rotation degradation associated with a failure event of a malfunctioning lift component resulting in a yaw torque causing a loss of control in the yaw axis; and wherein the flight controller is configured to adjust the lift angle of one or more of the plurality of lift components to eliminate the yaw torque.

2. The aircraft of claim 1, wherein the plurality of laterally extending elements includes a wing, wherein the wing includes a leading edge.

3. The aircraft of claim 2, wherein the at least a longitudinal thrust component is attached to the leading edge.

4. The aircraft of claim 1, wherein the first reference each adjustable lift angle includes a first nominal angle and a first canted angle.

5. The aircraft of claim 1, wherein the at least a longitudinal thrust component further comprises a reversible propulsor.

6. The aircraft of claim 1, wherein the sensor is attached to the aircraft.

7. The aircraft of claim 1, wherein the sensor is configured to:
 detect a failure event of a lift component of the plurality of lift components; and
 generate a failure datum associated to the lift component of the plurality of lift components.

8. The aircraft of claim 7, wherein the failure event includes the rotation degradation.

9. The aircraft of claim 7, wherein generating the failure datum further comprises determining a failure event description.

10. The aircraft of claim 1, wherein the flight controller is configured to:

receive, from the sensor, the failure datum associated with the lift component of the plurality of lift components;
determine a yaw correction as a function of the failure datum; and
command the longitudinal thrust component to perform the yaw correction.

11. The aircraft of claim 10, wherein determining the yaw correction further comprises:
 receiving a longitudinally aligned angle of the aircraft;
 identifying a yaw torque cancellation angle as a function of the longitudinally aligned angle; and
 determining the yaw correction as a function of the yaw torque cancellation angle.

12. The aircraft of claim 11, wherein receiving the longitudinally aligned angle further comprises obtaining a yaw input as a function of a yaw detector and receiving the longitudinally aligned angle as a function of the yaw input.

13. The aircraft of claim 11, wherein identifying the yaw torque cancellation angle further comprises:
 receiving a yaw torque as a function of the failure datum;
 determining a nullification element as a function of the yaw torque; and
 identifying the yaw torque cancellation angle as a function of the nullification element.

14. The aircraft of claim 1, wherein the flight controller is further communicatively coupled to the plurality of lift components.

15. The aircraft of claim 14, wherein the flight controller is further configured to command the plurality of lift components to perform a rotational operation.

16. The aircraft of claim 11, wherein the yaw torque cancellation angle is identified as a function of at least one of an air speed, a flight component movement, weather, and altitude.

17. The aircraft of claim 1, wherein the flight controller is further configured to:
 determine an angular deviation from the intended flight path due to the rotation degradation; and
 determine the adjustment to the lift angle of the one or more of the plurality of lift components required to generate a yaw torque cancellation angle required to eliminate the angular deviation.

* * * * *